United States Patent [19]

Lepic et al.

[11] Patent Number: 4,564,752

[45] Date of Patent: Jan. 14, 1986

[54] CONCURRENT, IMAGE-BASED, REJECT-RE-ENTRY SYSTEM AND METHOD

[75] Inventors: Daniel A. Lepic; Robert B. Nally, both of Waterloo, Canada

[73] Assignee: NCR Canada Ltd - NCR Canada Ltee, Mississauga, Canada

[21] Appl. No.: 452,663

[22] Filed: Dec. 23, 1982

[51] Int. Cl.[4] .............................................. G06K 5/00
[52] U.S. Cl. ....................................... 235/437; 382/57
[58] Field of Search ........................... 235/437; 382/57

[56] References Cited

U.S. PATENT DOCUMENTS

| | | | |
|---|---|---|---|
| 3,637,988 | 1/1972 | Yanagawa | 235/437 |
| 3,832,682 | 8/1974 | Brok et al. | 382/57 X |
| 3,949,363 | 4/1976 | Holm | 340/146.3 D |
| 3,988,571 | 10/1976 | Blair et al. | 235/61.9 R |
| 4,027,142 | 5/1977 | Paup et al. | 235/61.9 R |
| 4,068,212 | 1/1978 | Templeton | 382/57 |
| 4,201,978 | 5/1980 | Nally | 340/146.3 C |
| 4,205,780 | 6/1980 | Burns et al. | 235/454 |
| 4,264,808 | 4/1981 | Owens et al. | 235/379 |

FOREIGN PATENT DOCUMENTS 1449649 7/1969 Fed. Rep. of Germany .
1599079 7/1971 Fed. Rep. of Germany .
2363836 3/1978 France .

Primary Examiner—David L. Trafton
Attorney, Agent, or Firm—Albert L. Sessler, Jr.; Elmer Wargo

[57] ABSTRACT

A method and system for processing documents such as checks for achieving concurrent, reject, re-entry of sorter rejects of the documents in association with a sorting machine. A document reader such as a MICR reader for example, and an imaging apparatus are included along the document track to generate MICR data and digitized image data for each document passing thereby. A document whose MICR data is read correctly is routinely sorted while a document whose MICR data is not read correctly or completely is sorted in a reject pocket. The data needed to complete or correct the MICR data is obtained by an operator viewing an image of the document on a data entry terminal while the associated document is still physically located in the reject pocket. After a first pass or run of the documents through the sorter, the now-complete data obtained by the operator is used to sort the rejected documents on a second pass through the sorter to provide the re-entry of the sorter rejects.

7 Claims, 7 Drawing Figures

CONCURRENT, IMAGE-BASED, REJECT-RE-ENTRY SYSTEM AND METHOD

This application is related to application Ser. No. 452,524 having the same filing date as this application and having the same assignee as this application.

BACKGROUND OF THE INVENTION

This invention relates to a banking method and system for processing documents and more particularly, for achieving concurrent, reject-re-entry of sorter rejects of documents such as checks in association with a sorting machine.

The documents such as checks which are used currently in banking systems have certain data such as individual account numbers, bank routing numbers etc., printed thereon in magnetic ink, and this data is commonly referred to as magnetic ink character recognition or MICR data. When a check is received at a bank for processing, the monetary amount of a typical check is written, for example, by a customer in plain or nonmagnetic ink. Part of the general, routine processing of a check requires that the monetary amount of the check be printed thereon in magnetic ink, thereby making it part of the MICR data on the check.

Generally, such typical checks are processed in "batches" of checks with about 200-300 checks being in each batch. Certain accounting or banking operations are performed on a "batch" of such checks. For example, after the checks have the associated monetary amounts printed thereon in MICR ink, the batch of checks may be run through a banking machine such as a check sorter, to sort the checks and to obtain a total monetary amount of all the checks included in that batch of checks. This batch total may be used in subsequent batch operations as a check of the accuracy of those operations.

Continuing with the example of banking operations performed on a check sorter, there are generally two classes of documents processed by these check sorters in a typical installation, namely:

1. Over-the-counter items, and
2. Inclearings.

The over-the-counter items are the items like checks, deposit slips, etc. arising from transactions conducted at the processing bank itself or at its branches. These items are proven and encoded in batches, for example, as previously explained and are then processed by a sorter which is also typically referred to as a reader/sorter. The processing which includes data capture for the creation of "cash letters" etc. generally includes the sorting of documents by passing the documents through the sorter several times or passes depending on different sorting criteria, the number of "sorting pockets" in the particular sorter used, and the particular sorting algorithm associated with the sorter's processing system. Generally, with over-the-counter items, the first or prime pass on the sorter is used to separate the "On-Us" documents from the "Transit" documents, with the On-Us documents being drawn on the processing bank and with the Transit documents being drawn on other banks. Other passes may be used to single out Deposits, Cash In/Out tickets, for example.

Basically, the documents in the Inclearings class are all "On-Us" documents which have been received from "other banks" or clearing facilities, and generally, the only processing activity required on the sorter is the capture of the MICR data, for example, for use in updating and sorting the documents to the individual customer accounts. While this explanation has proceeded with a discussion of MICR data, the reader/sorter mentioned may also have an optical character recognition (OCR) reader associated therewith to also machine-read the data thereon. The capture of the MICR and/or OCR data is used for the updating and sorting of the documents mentioned.

During the activities mentioned on the reader/sorter, some of the documents cannot be interpreted due to poor encoding or printing, dirt, folding, etc.; and consequently, these unreadable documents are sorted into a reject pocket. Those documents which are read properly are sorted into the various pockets of the sorter according to a particular application program or set of routing instructions in effect at the time of sorting. Those documents which lie in the reject pocket generally have to be processed manually to extract the necessary information from the documents and thereafter merge this information into the associated data capture files. The process of manually completing information extraction from the rejected documents, the merging of this extracted information into the proper or associated data capture file, the reconciling of any outstanding balance conditions caused by the rejected documents, and the physical re-entering of the rejected documents back into the associated document processing stream is referred to as REJECT RE-ENTRY.

In a typical prior-art, re-entry system the documents which are rejected at a sorter due to a nonreadable condition, for example, are manually taken to a separate "reject-re-entry transport and console" where data re-entry is effected.

At the re-entry transport/console, data reentry is effected by an operator who visually observes the physical document and enters the needed data on a keyboard to complete it. In some re-entry procedures, the associated console contains MICR/OCR readers to attempt to automatically re-read the document and thereby minimize the amount of data to be manually entered, thereby facilitating the overall re-entry operation. If the re-entry procedure is not on line, the re-entered data is stored in a local memory device and later it is transferred or merged into the main data file. If the system is on-line, the re-entered data is immediately merged into the main data file. In some on-line systems, the associated data processor sometimes sends the keyboard operator location or pointer clues to facilitate isolating the rejected character or characters while the operator is looking at the physical document to facilitate the manual re-entry of data.

In some prior art systems, a bar code is printed or encoded on the back of each document passing through the sorter during the first or prime run; sometimes the bar code is placed on the backs of only the rejected documents during re-entry processing. This bar code is used as a unique identifier and serves as a basis for physical re-entry of the rejected documents back into the main document stream.

SUMMARY OF THE INVENTION

The document re-entry system of this invention comprises: a transport system having a track along which documents are fed sequentially in a feeding direction by an associated feed mechanism; reading means positioned at said track in operative relationship with said documents as they are fed along said track so as to read therefrom data associated with each said document; said reading means including means to determine whether the data read from each said document is complete or incomplete with respect to predetermined criteria and to produce corresponding complete and incomplete signals, respectively; diverting means positioned along said track for diverting into a reject area those of said documents having a said incomplete signal associated therewith; processing means for processing said data read by said reading means and for controlling said diverting means; said processing means including: storing means for storing said data read from said documents and also for enabling said data read to be distinguished as complete or incomplete with regard to the associated documents; means for completing data for those documents having an incomplete signal associated therewith, and comprising: an imaging apparatus positioned along said track downstream along said feeding direction from said reading means to produce digitized image data of each said document passing thereby; data development means including a memory for storing said digitized image data, a display and a keyboard; and interface means for interfacing said processing means with said data development means to enable said data for a document having an incomplete signal associated therewith to be viewed on said display along with an image for said document derived from the associated digitized image data from said memory to enable an operator to key in additional data on said keyboard to thereby complete the data forming completed data for said last-named document; said completed data being transferred from said data development means to said storing means via said interface means and said processing means upon actuation of a transfer key on said keyboard while the associated said last-named document is in said reject area.

The method of this invention of processing documents comprises the steps of: (1) moving the documents along a track in reading relationship with a reader; (2) reading data from said documents during said moving step; (3) deciding whether the data read in said reading step is complete or incomplete with regard to predetermined criteria; (4) storing the data read from said documents in a memory and in a manner enabling the data read from said documents to be distinguished as complete or incomplete with regard to the associated documents; (5) imaging said documents after said reading step while being moved along said track so as to produce digitized image data for each said document; (6) diverting into a reject area those documents whose data read is incomplete; (7) developing data for each of said documents whose data read from said reading step is incomplete by utilizing the associated data from said reading step and the associated digitized image data from said imaging step to produce completed data for the associated document; said developing step being initiated after said diverting step and being performed concurrently while the associated document is in said reject area; and (8) storing said completed data in said memory.

The advantages of this invention are as follows:

1. The system is on-line and concurrent. The use of images of the documents for data re-entry minimizes time-consuming document handling. The images of the documents are captured on the first pass through the sorter. Physical re-entry of the rejected documents is accomplished by feeding the rejected documents (after completing the data therefor) through the same sorter under the control of a specially-prepared, re-entry sort file.

2. The use of images of the documents also permits the use of sophisticated, computer-invoked, graphical clues, and assist techniques like high lighting, for example, to facilitate the location of the rejected character or characters. With less physical handling of the documents, there is less possibility for handling-induced problems such as lost or extra documents.

3. No costly encoders for printing special identification codes or special readers are required other than the standard MICR/OCR readers usually associated with a sorter.

4. This invention may be added to a conventional sorter as an "add-on" feature without sorter redesign.

5. These advantages and others will be more readily understood in connection with the following specification, claims and drawing.

DETAILED DESCRIPTION OF THE INVENTION

Figure 1A:
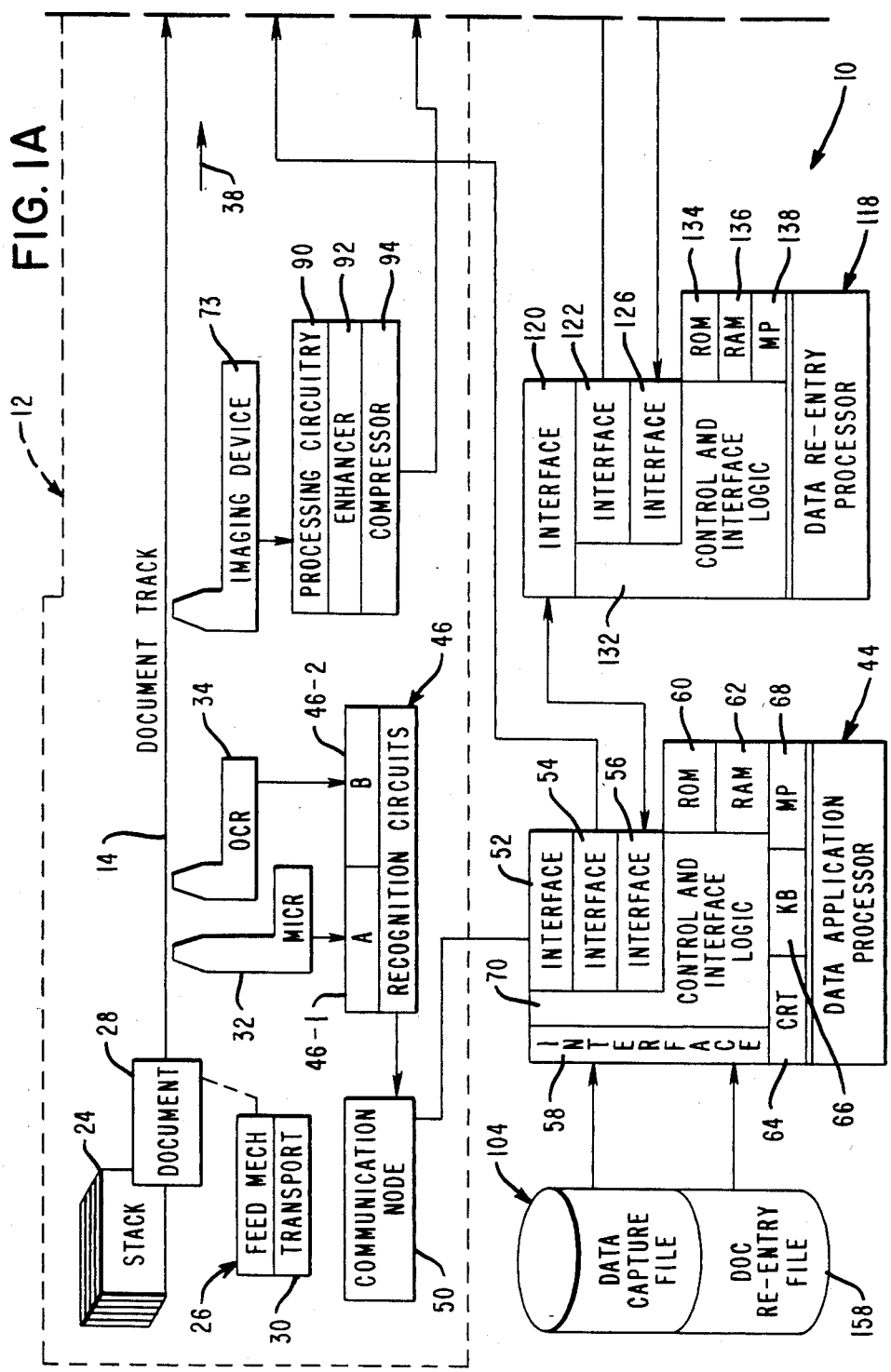
FIGS. 1A and 1B, taken together, show a schematic view, in block form, of a system which depicts a preferred embodiment of this invention.
Figure 1B:
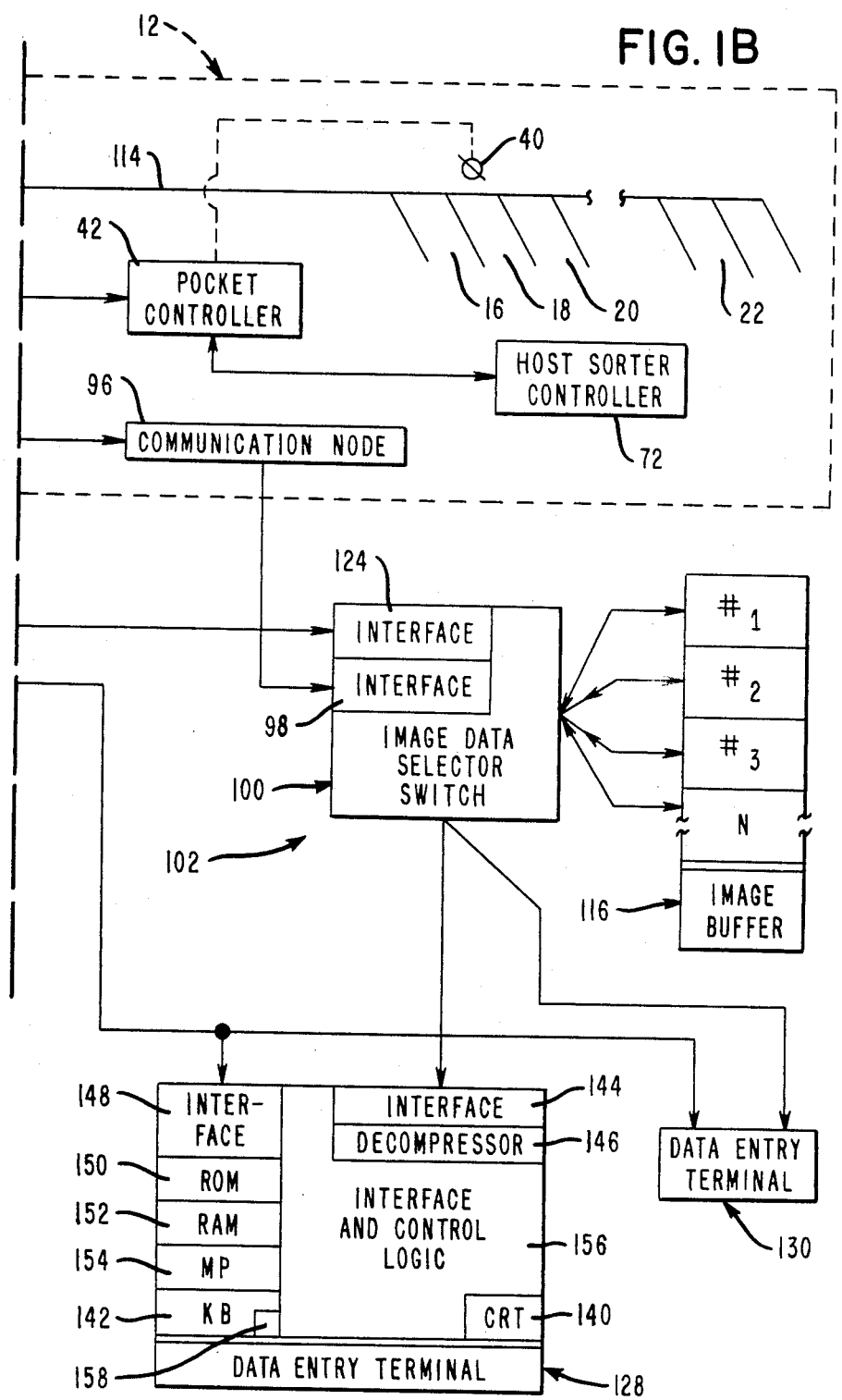

FIGS. 1A and 1B, taken together, show a preferred embodiment of an on-line, concurrent, image-based, sorter-reject, re-entry system of this invention which is referred to hereinafter as system 10. The system 10 includes a conventional reader/sorter which is shown in a dashed rectangle and will be referred to hereinafter as sorter 12.

The sorter 12 (FIGS. 1A and 1B) includes a document track 14 having a plurality of sorting pockets therein such as pockets 16, 18, 20, and 22. In the system 10, a "batch" of documents to be processed (such as 200-300 for example, in a batch) is placed in a stack 24 next to the track 14, and a conventional feed mechanism 26 is used to pick a document like 28 from the stack 24 and transfer it to the track 14 where a transport mechanism 30 associated with the feed mechanism 26 moves the document at a constant velocity along the track 14.

Figure 2:
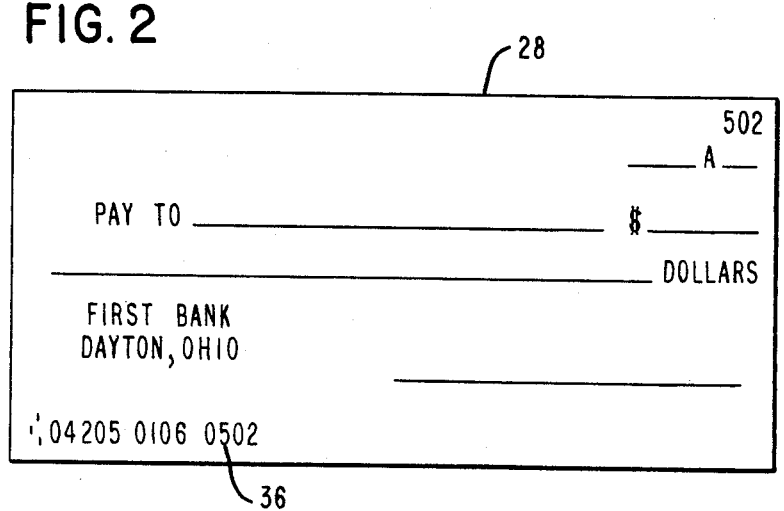
FIG. 2 is a plan view of a document such as a check which is processed by the system shown in FIGS. 1A and 1B.

In the embodiment described, the documents like 28 are checks and deposit slips, for example, which are processed in "batches" as previously described. As each document 28 is moved along the track 14, it is brought into operative relationship with a conventional magnetic ink character recognition (MICR) reader 32 and/or a conventional optical character recognition (OCR) reader 34, which readers are positioned along the track 14. The reader 32 is positioned so as to read the MICR line 36 of data (FIG. 2) as the document 28 is moved thereby. The MICR line 36 may also be read optically by the OCR reader 34, which is positioned slightly downstream from the MICR reader 32 along the direction of travel shown by arrow 38. The OCR reader 34 could also be used to process rejects from non-MICR coded documents such as "remittance slips" which are printed generally in plain or non-magnetic inks. At this point, it should be recalled from the earlier discussion herein, that the MICR line 36 on a document 28 contains, for example, the identification of the associated bank and routing number, customer's account number, and the monetary amount of the check. As a batch of documents 28 is passed through the sorter 12, the MICR line 36 on each of the documents is read and the data read is utilized to sort the specific documents into the various sorter pockets 18–22, for example, with pocket 16 being the reject area or pocket.

The sorter 12 has a conventional document diverting mechanism (shown diagrammatically as a diverter 40) associated therewith for diverting the documents like 28 into the various pockets 16–22 mentioned. The diverter 40 is controlled by a pocket controller 42 which receives its sorting instructions from a data application processor designated generally as 44 and shown in FIG. 1. The application processor 44 utilizes the data read from the documents 28 in association with its application programs to provide the sorting instructions to the pocket controller 42.

The sorter 12 has conventional recognition circuits 46 (FIG. 1) associated therewith, with circuit "A" or 46-1 being used for the MICR reader 32, and with circuit "B" or 46-2 being used for the OCR reader 34. The recognition circuits 46-1 and 46-2 interpret the data from their associated readers 32 and 34, respectively, and each produces a packet 48 of information or data (not shown, but which will be described hereinafter). Separate packets of data may be sent to the data application processor 44 for use thereby, or a composite packet of data may be prepared by the recognition circuits 46 to be sent to the processor 44; however, for ease of illustration only a packet 48 of data derived from the MICR reader 32 will be described hereinafter.

Continuing with the example being discussed, this packet 48 of data is routed to the application processor 44 via a conventional communication node 50 associated with the sorter 12 and a conventional interface 52 associated with the application processor 44. The recognition circuits 46-1 and 46-2 can also determine whether or not the data read is complete with regard to predetermined criteria. For example, if the packet 48 of data is supposed to contain 30 MICR characters for each document 28 passing along the track 14, and one or more of these characters is or are missing, the packet 48 of data will be tagged with a conventional code to indicate that a particular character is missing and to indicate its location in the packet 48 of data, for example.

The application processor 44 (FIG. 1A) which utilizes the packets 48 of data from the recognition circuits 46-1 and 46-2 includes interfaces 52, 54, 56, and 58, read only memory (ROM) 60, random access memory (RAM) 62, a display such as a cathode ray tube (CRT) 64, a keyboard (KB) 66, a processor (MP) 68 and control and interface logic 70. The processing routines associated with the application processor 44 may reside in the ROM 60; however, the routines are loaded, more typically, in the RAM 62 from a disc or tape storage, for example, as part of a conventional start-up procedure. The CRT 64 is used to provide communication with an operator who uses the KB 66 to enter data or instructions. The control and interface logic 70 provides the interconnections among all the various components of the application processor 44 to enable it to function conventionally as an application processor.

At this point, it should be pointed out that the sorter 12 has its own conventional host sorter controller 72 (FIG. 1B) which controls and synchronizes the various components of the sorter 12 as is typically done. To simplify the drawing, individual control lines from the host sorter controller 72 to its associated components such as the feed mechanism 26, for example, are not shown. The data application processor 44 performs functions associated with this invention, which functions will be described hereinafter.

Assume, for the moment, that a stream of documents 28 from a batch is moving past the readers 32 and 34, and that all data read is complete and correct and is transferred to the application processor 44. As each document 28 is moved along the track 14 past the reader 32, for example, the packet 48 of data associated with that document 28 is utilized by the application processor 44 to decide into which pocket (18–22) of the sorter 12 the document is to be diverted or sorted. The packet 48 of data including, for example, account number, bank routing number, and monetary amount is then used by processor 44 along with its application programs to make a sort decision. This sort decision passes out the interface 54 to the pocket controller 42 which then actuates the appropriate diverter 40 to direct the document into the appropriate pocket 18–22. Various totals and proof/balance conditions for various groups of documents may also be calculated and stored as is done customarily in the reconciliation process.

Figure 3:
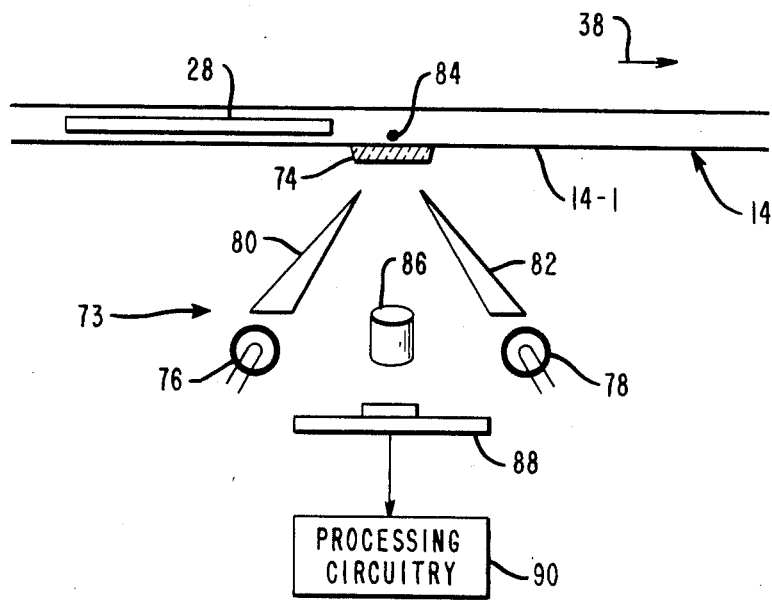
FIG. 3 is a plan view, similar to FIG. 1, showing additional details of an imaging device shown in FIG. 1.

But in actual practice, documents 28 are not all read and sorted routinely as described in the previous paragraph; there are document rejects which are not read correctly or completely. To assist in facilitating the re-entry of rejected documents, the system 10 utilizes an imaging apparatus including an imaging device 73. The imaging device 73 may be conventional and is shown in schematic form in FIG. 1A and in more detail in FIG. 3. The imaging device 73 is positioned downstream from MICR and OCR readers 32 and 34 and is positioned in operative relationship with a document 28 as it is moved in the track 14 past the imaging device 3. The imaging device 73 includes a glass window 74 which is positioned on a sidewall 14-1 of the track 14 to enable light from the light sources 76 and 78 to be directed by the associated light guides 80 and 82, respectively, on to a scanning line 84. The scanning line 84 is shown as a point in FIG. 3, because FIG. 3 represents a top or plan view of the track 14. The top, long edge of the document 28 is viewed in FIG. 3, and in normal operation, the document is moved on its lower, long edge, with the front of the document 28 facing the imaging device 73 as it is moved thereby; the scanning line in this environment is oriented in a vertical direction. As a document 28 is moved past the scanning line 84, the right-most edge of the document 28 (as viewed in FIG. 3) is illuminated by the sources of light 76 and 78, and light reflected therefrom through the window 74 is focused by a suitable lens system 86 on to the imaging sensor array 88. In the embodiment described, the array 88 may be of a type which produces a fixed number of picture elements or pixels along the scanning line 84. One such array 88, such as RL-1024B which is manufactured by Reticon Corporation, for example, produces 1024 pixels along the scanning line 84, although only 640 pixels are utilized to meet the resolution requirements of the embodiment described. As the document 28 is moved in the downstream direction shown by arrow 38, a new area of the document is presented to the scanning line 84 which produces a new set of 640 pixels therealong. Each pixel from the sensor array 88 has an associated analog, gray-scale value which is converted or digitized by the processing circuitry 90 to produce, for example, a six bit byte of data for each pixel, thereby recording 64 shades of gray ranging from white to black. As the scans are completed, a stream of bytes of data is issued from the processing circuitry 90. Because this aspect is conventional, it need not be described in any further detail.

The stream of bytes of data or pixels from the scanning line 84 (FIG. 3) of the "image" of a document 28 is further processed by having the output of the processing circuitry 90 fed into an enhancer 92, whose output, in turn, is fed into a compressor 94. The enhancer 92 is conventional and is a circuit which is used to eliminate unnecessary background information and to make the pertinent data stand out from background information, for example. The compressor 94 is a conventional circuit which receives the enhanced data from the enhancer 92 and eliminates that data which is 37 meaningless" or redundant and thereby "compresses" the remaining data to produce compressed, digitized-image data which reduces the amount of transmission time necessary to transmit the data associated with an image of a document 28 and which also reduces memory storage requirements. The output of the compressor 94 is fed to a conventional communication node 96 (FIG. 1B) whose output is coupled to an interface 98 which is part of an image data selector switch 100. The selector switch 100 is part of a means 102 (FIG. 1B) for completing data associated with a document 28 which is rejected; this aspect will be covered in detail hereinafter.

For the moment, it is sufficient to state that the imaging device 73 records the image of each document passing thereby; however, if the packet 48 of data about a document 28 is complete as read by the MICR reader 32, for example, the image data associated with this document is purged or eliminated. If the packet 48 of data about a document 28 is incomplete as read by the MICR reader 32, for example, the image data associated with this document is retained so as to facilitate completion of the data by the means 102 (FIG. 1B) for completing data which will be described hereinafter.

Continuing with the example for which the data read from each document 28 is complete, each of the associated packets 48 of data from the recognition circuits 46 is forwarded serially to the data application processor 44 (FIG. 1A) via the communication node 50 and the interface 52. The data application processor 44, through its control and interface logic 70 and the interface 58, forwards each of the packets 48 of data to a memory storage or a data capture file 104. The packets 48 of data are placed sequentially in the file 104 as shown schematically in FIG. 4. For example, the solid line 106 represents a complete packet 48 of data for a first document 28, and the dashed line 108 represents an incomplete packet 48 of data for the next document 28 moved along the track 14 as determined by the recognition circuits 46.

Figure 4:
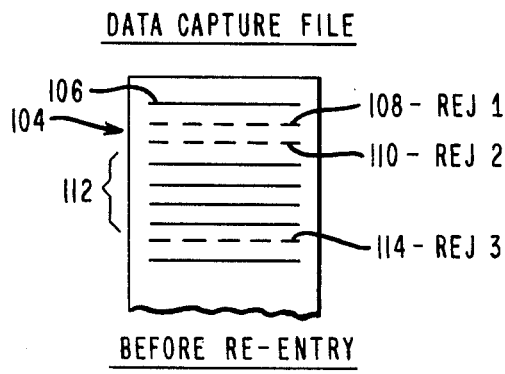
FIG. 4 is a schematic diagram of the data capture file shown in FIG. 1 to show the organization of the packets of data therein.

Dashed line 108 (FIG. 4) represents the first, rejected document 28, and dashed line 110 represents the second, rejected document from the stack 24 in the example described. As earlier stated, the packet 48 of data is tagged or flagged by the recognition circuits 46 in a way which indicates the "character or characters" which are missing or unreadable to cause the associated document to be diverted to the reject pocket 16. Following the packet 48 of data for reject #2 (dashed line 110), there are several lines grouped in bracket 112 to represent packets 48 of data which are complete, and dashed line 114 represents an incomplete packet 48 of data for the third rejected document 28 or reject #3. The documents 28 corresponding to the packets 48 of data which are complete and shown by line 106 and bracket 112 are sorted into the appropriate pockets 18-22 (FIG. 1B) according to the particular application program associated with the application processor 44, and the documents 28 corresponding to the packets 48 of data which are incomplete as shown by dashed lines 108, 110, and 114 in FIG. 4 are routed to the reject pocket 16. While the application program for controlling the sorting of the documents 28 may reside in the ROM 60 of the data application processor 44, it is loaded typically from a disc unit or a tape cassette (not shown), for example, into the RAM 62 (FIG. 1B). The KB 66 on the data application processor 44 may be used to initiate or control the loading of the application program or programs. The sorting instructions from the application program being used are routed from the application processor 44 through its interface 54 to the pocket controller 42 of the sorter 12 as previously explained.

It should be pointed out that due to the speed of the documents 28 being moved along the document track 14, a particular document 28, after moving past the MICR and OCR readers 32 and 34, will have been moved past the imaging device 72 before its status, with regard to its data read being complete or incomplete, is determined. Accordingly, the images of all documents 28 passing along the track 14 are obtained and routed to the image data selector switch 100 via the communication node 96 as previously mentioned.

The data selection switch 100 (FIG. 1B) is conventional and may include standard CMOS integrated cross-point, selector switches such as those manufactured by RCA Corporation, for example. The switch 100 also includes a memory or image buffer 116 which functions on a first-in, first-out or FIFO basis, with each section like section #1, #2 through N being used to store data representing a compressed image of a document 28. The switch 100 is controlled by a data re-entry processor which is designated generally as 118 (FIG. 1A), and this processor 118 is operatively coupled to the data application processor 44 and the data selector switch 100 to facilitate the completing of data at the means 102 for completing data (FIG. 1B) as will be described later herein.

The re-entry processor 118 (FIG. 1A) includes the two-way interface 120 by which the re-entry processor 118 communicates with the data application processor 44, an interface 122 by which the re-entry processor 118 transfers data to the switch 100 via its associated interface 124, and an interface 126 which is a two-way interface between the re-entry processor 118 and a plurality of data entry terminals such as 128 and 130 which are part of the means 102 for completing data. The re-entry processor 118 also includes a control and interface logic 132, ROM 134, RAM 136 and MP 138 which are conventionally organized as shown.

It should be recalled that the application processor 44 sends instructions to the pocket controller 42 to control the disposition of the documents 28 into the various sorter pockets 16–22. Those documents 28 having a complete packet 48 of data are sorted in pockets 18–22, for example, and those documents 28 having an incomplete packet 48 of data are routed to the reject pocket 16. At the same time that the sorting data is sent to the pocket controller 42, the status of each of the packets 48 of data, i.e., whether complete or incomplete, is sent from the data application processor 44 to the re-entry processor 118 via the interface 120. For example, from the packets 48 of data in the data file 104 in FIG. 4, an indication that the packet 48 of data (line 106) is complete is forwarded to the re-entry processor 118, and the first and second partially completed packets 48 of data (lines 108 and 110) are forwarded to the re-entry processor 118 as rejects #1 and #2 and stored, for example, in the RAM 136. While processing is being effected by the data application processor 44, the digitized image data resulting from the imaging device 72 is forwarded to the image buffer 116 (FIG. 1B) as previously explained. For example, compressed, image data for the first document 28 in the stack 24 may be positioned in the location #1 in the image buffer 116, and compressed image data for the second document 28 is placed in location #2 in the image buffer 116, etc. In the example described, the image data in location #2 in the image buffer 116 corresponds to the first reject document whose packet 48 of data is incomplete in the data capture file 104 (FIG. 4) and is represented by line 108 therein. Shortly after the documents 28 have passed the MICR and OCR readers 32 and 34, and the imaging device 72, the data application processor 44 will have received the complete/incomplete status with regard to the MICR line of data, for example. This complete/incomplete status is forwarded from the data application processor 44 to the re-entry processor 118 via interfaces 56 and 120 as previously mentioned. Using this complete/incomplete status, the re-entry processor 118 makes a decision to purge or retain, respectively, the compressed image data in the image buffer 116 for the corresponding document 28. Based on typical, sorter-reject rates, approximately 2% of the "images" of the documents 28 will be retained in the image buffer 116 because they will correspond to rejected documents.

These images of the rejected documents 28 remain in the image buffer 116 (FIG. 1B) only as long as it takes one of the data entry terminals like 128 and 130 to become available. Terminal 130 is identical to terminal 128; therefore, a description of only terminal 128 will be given.

The terminal 128 (FIG. 1B) is a conventional, semi-intelligent device which includes a display such as a high-resolution, cathode-ray tube (CRT) 140 and an entry keyboard (KB) 142. The terminal 128 also includes an interface 144 for receiving compressed image data from the selector switch 100, a decompressor 146 for decompressing the image data to enable it to be viewed on the CRT 140, a bi-directional interface 148 for receiving data from the re-entry processor 118 and for sending data thereto, a ROM 150, a RAM 152, a MP 154, and interface and control logic 156 for interconnecting, conventionally, the various components included in the terminal 128.

Figure 5:
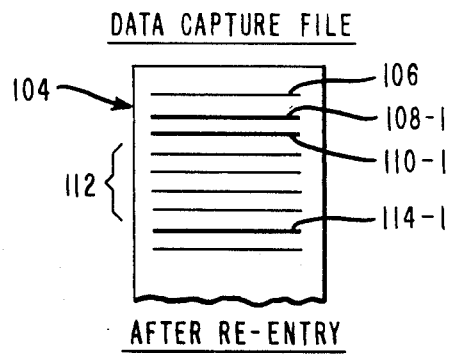
FIG. 5 is a schematic diagram similar to FIG. 4, showing re-entered data.

Continuing with the example given, if terminal 128 is available, the compressed image data in location #2 of the image buffer 116 (for the first rejected document 28) is forwarded to the terminal 128 via the interface 144, and thereafter it is decompressed by the decompressor 146 for viewing on the CRT 140. The reentry processor 118, at this time, also forwards the corresponding line 108 (FIG. 4) of incomplete data to the terminal 128 via the interface 148. This line 108 of incomplete data is also displayed on the CRT 140 to indicate to the operator of the terminal 128 what has been obtained previously via the MICR reader 32, for example. The re-entry processor 118 has sufficient conventional routines located in either the ROM 134 or RAM 136, for example, to correlate a line of incomplete data like line 108 with the corresponding compressed image data (like reject #1 in location #2 of the image buffer 116) and have them delivered to the CRT 140 for viewing by an operator. In addition, the re-entry processor 118 may highlight the missing character or characters on the line of incomplete data like 108 by pointing to it or to them with an arrow, for example, on the CRT 140. The operator then looks at the image of the document 28 on the CRT 140 and enters on the KB 142 the missing data. When the missing data is entered completely, the operator then actuates a transfer key 158 on the KB 142 to transfer the completed line 108-1 of data via the interface 148, the re-entry processor 118, the application processor 44 and the interface 58 to the data capture file 104 and a document re-entry file 158 (FIG. 1A). FIG. 5 shows the data capture file 104 after re-entry, with the now-completed line 108-1 of data in the location where the corresponding partially-completed line 108 of data existed in FIG. 4. Note that the line 106 of data and those lines of data included in bracket 112 which were initially complete remain as complete lines of data in their original locations.

Figure 6:
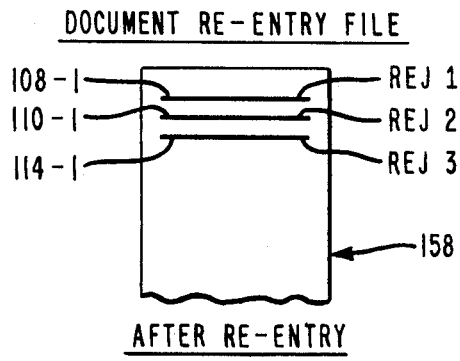
FIG. 6 is a schematic diagram of the document re-entry file shown in FIG. 1, showing the organization thereof.

The document re-entry file 158, having the organization shown in FIG. 6, contains the completed lines of data for those documents 28 which were rejected initially as having incomplete lines of data. In the example being described, only the line 108-1 of now-completed line 108-1 would be added to the file 158 at this time.

After the successful re-entry of data associated with the line 108-1 of data as described, the data entry terminal 128, which handled the transaction, is purged of the data associated with that document. Also with regard to purging, as soon as the compressed image data from location #2 of the image buffer 116 is sent to entry terminal 128 for the completing of the line 108 of data already described, the location #2 in the image buffer 116 is "purged" of data, or stated another way, the location #2 becomes available to be overwritten with compressed, digitized data for another rejected document 28. Because location #1 of image buffer 116 relates to a document 28 having complete data, it would also be purged.

During the time that an operator is completing the line 108 of data just described, a second operator at the entry terminal 130 (FIG. 1B) receives the compressed, digitized data from location #3 in the image buffer 116; it should be recalled that in the example described, location #3 now contains the line 110 of incomplete data associated with Reject #2 as seen from FIG. 4. The operator at terminal 130 then completes the data for line 110 as described in relation to terminal 128. After the line 110 (FIG. 4) of incomplete data is completed as discussed in relation to line 108, it becomes completed line 110-1 of data which is transferred to and is located in the data capture file 104 and the document re-entry file 158 as shown in FIGS. 5 and 6, respectively. The terminal 130 is then purged of the data associated with the line 110 and the associated image data and is ready to receive data associated with the next rejected document 28. This process is repeated until all the documents 28 in the stack 24 have been processed by the sorter 12.

To summarize, those documents 28 which are complete and are read routinely by the MICR and OCR readers 32 and 34 of the sorter 12 are sorted into the appropriate pockets 18-22 according to application programs associated with the data application processor 44. Those documents 28 for which the data read is incomplete are located in the reject pocket 16. The reentered or completed data for these rejected documents is obtained in connection with the data entry terminals 128 and 130, for example, and this completed data is transferred to the data capture file 104. This completed data is used to create the document re-entry file 158 (FIG. 6) which, in effect, is a listing of the rejected documents 28 which physically are located in the same order in the reject pocket 16 of the sorter 12.

In order to complete the physical re-entry of the documents 28, those documents 28 which are in the reject pocket 16 of the sorter 12 are removed therefrom (but are kept in the same order) and are placed in a stack like 24 to be moved through the sorter 12 in a second pass therethrough. These rejected documents 28 are moved sequentially past the MICR and OCR readers 32 and 34 in an attempt to re-read them. There is a great probability that these rejected documents 28, again, will not be read completely; however, for whatever portion of data is read, a data matching attempt by the data application processor 44 can be made for that portion which is read to determine whether or not the rejected documents 28 are in the right order as they appear in the document re-entry file 158. While these documents 28 would normally be sorted into the reject pocket 16 because the associated data read is incomplete, the completed data therefor now exists in the updated data capture file 104 (FIG. 5) or in the document re-entry file 158 (FIGS. 1A and 6), and this completed data is used by the data application processor 44 to instruct the pocket controller 42 to divert or sort the rejected documents 28 into the appropriate pockets 18-22, in the example described. Note that no effort is made to correct or complete the MICR data, for example, on the rejected check itself.

The completed data which exists in the data capture file 104 (FIGS. 1A and 5) may be used for the various reconciliation procedures such as balancing of totals, updating accounts, etc., usually encountered in the banking operations discussed earlier herein. Another feature of this invention is that the document reentry file 158 may be used to provide a list of documents 28 having potential "mis-read" problems to banks which must handle the documents 28 in subsequent, routine, banking operations, i.e. the transit items.

Some additional general comments appear appropriate. A sorter 12 of the type selected to portray the preferred embodiment of this invention, may be of type #6780 which is manufactured by NCR Corporation of Dayton, Ohio. This sorter has a throughput of about 1400 documents per minute for documents having a length of six inches. With a typical reject rate of 2% of the documents 28 having "incomplete" data, a maximum or worst reject rate of about twenty eight documents per minute can be anticipated. This reject rate is well within the capability of operators working at the data entry terminals 128, 130 in FIG. 1B. For example, proof-machine operators who key in the entire monetary amount fields have been measured at keying-rates of 65 documents per minute in a burst mode, and they can sustain rates of 25-35 documents per minute for a regular working day. Accordingly, a reject rate of 2% or about 28 documents per minute would appear to be handled quite readily with 2 data entry terminals like terminal 128.

Another feature of this invention relates to the truncation of documents such as checks. Truncation as used herein means that a bank will send an image of a check to be truncated instead of sending the physical check itself back to the bank which normally handles or receives the check. For example, if a document like 28 has a special mark thereon, indicating a willingness (by the drawer of the check and associated bank) to have the check truncated, the special mark is read by the MICR reader 32, for example, and is used to sort the documents to be truncated into a special pocket of the sorter. The associated digitized image data developed from the imaging device 72 for each document is stored in an image buffer and is later processed electronically to develop an image of that document. The image of the document instead of the document itself then can be sent electronically to the bank where the physical document would normally be sent.

We claim:

1. A document re-entry system comprising:
   a transport system having a track along which documents are fed substantially in a feeding direction by an associated feed mechanism;
   reading means positioned at said track in operative relationship with said documents as they are fed along said track so as to read therefrom data associated with each said document; said reading means including means to determine whether the data read from each said document is complete or incomplete with respect to predetermined criteria and to produce corresponding complete and incomplete signals, respectively;
   diverting means positioned along said track for diverting into a reject area those of said documents having a said incomplete signal associated therewith;
   processing means for processing said data read by said reading means and for controlling said diverting means;
   said processing means including:
   storing means for storing said data read from said documents and also for enabling said data read to be distinguished as complete or incomplete with regard to the associated documents;
   means for completing data for those documents having an incomplete signal associated therewith, and comprising:
   an imaging apparatus positioned along said track downstream along said feeding direction from said reading means to produce digitized image data of each said document passing thereby;
   data development means including a memory for storing said digitized image data, a display and a keyboard; and
   interface means for interfacing said processing means with said date development means to enable said data for a document having an incomplete signal associated therewith to be viewed on said display along with an image for said document derived from the associated digitized image data from said memory to enable an operator to key in additional data on said keyboard to thereby complete the data forming completed data for said last-named document;

said completed data being transferred from said data development means to said storing means via said interface means and said processing means upon actuation of a transfer key on said keyboard while the associated said last-named document is in said reject area;

said reading means including a reader for reading magnetic ink character recognition or MICR data; and said storing means including a first memory for storing said data read by said reading means for all said documents fed along said track and also including a second memory for storing said completed data for those said documents having a said incomplete signal initially associated therewith.

2. A document re-entry system comprising:

a transport system having a track along which documents are fed substantially in a feeding direction by an associated feed mechanism;

reading means positioned at said track in operative relationship with said documents as they are fed along said track so as to read therefrom data associated with each said document; said reading means including means to determine whether the data read from each said document is complete or incomplete with respect to predetermined criteria and to produce corresponding complete and incomplete signals, respectively;

diverting means positioned along said track for diverting into a reject area those of said documents having a said incomplete signal associated therewith;

processing means for procsssing said data read by said reading means and for controlling said diverting means;

said processing means including:

storing means for storing said data read from said documents and also for enabling said data read to be distinguished as complete or incomplete with regard to the associated documents;

means for completing data for those documents having an incomplete signal associated therewith, and comprising:

an imaging apparatus positioned along said track downstream along said feeding direction from said reading means to produce digitized image data of each said document passing thereby;

data development means including a memory for storing said digitized image data, a display and a keyboard; and interface means for interfacing said processing means with said data development means to enable said data for a document having an incomplete signal associated therewith to be viewed on said display along with an image for said document derived from the associated digitized image data from said memory to enable an operator to key in additional data on said keyboard to thereby complete the data forming completed data for said last-named document;

said completed data being transferred from said data development means to said storing means via said interface means and said processing means upon actuation of a transfer key on said keyboard while the associated said last-named document is in said reject area;

said reading means including a reader for reading magnetic ink character recognition or MICR data;

said storing means including a first memory for storing said data read by said reading means for all said documents fed along said track and also including a second memory for storing said completed data for those said documents having a said incomplete signal initially associated therewith;

said memory of said data development means being a first-in, first-out or FIFO memory and said interface means purging from said FIFO memory all said digitized images except those having said incomplete signals associated therewith.

3. The system as claimed in claim 2 in which said display and said keyboard are part of a data entry terminal and said system includes at least two said data entry terminals; and in which said data development means also includes a means for switching a next available said digitized image data from said FIFO memory to a next available one of said data entry terminals in response to said interface means.

4. The system as claimed in claim 3 in which said imaging apparatus comprises an imaging device for producing a digitized image for each said document passing thereby, and a compressor circuit for compressing said digitized image to produce said digitized image data; each said data entry terminal including a decompressor circuit for decompressing a said digitized image data to produce an associated said image on the associated said display.

5. A method of processing documents in a document re-entry system comprising the steps of:

(1) moving the documents along a track in reading relationship with a reader;

(2) reading data from said documents during said moving step;

(3) deciding whether the data read in said reading step is complete or incomplete with regard to predetermined criteria;

(4) storing the data read from said documents in a memory and in a manner enabling the data read from said documents to be distinguished as complete or incomplete with regard to the associated documents;

(5) imaging said documents after said reading step while being moved along said track so as to produce digitized image data for each said document;

(6) diverting into a reject area those documents whose data is read is incomplete;

(7) developing data for each of said documents whose data read from said reading step is incomplete by utilizing the associated data from said reading step and the associated digitized image data from said imaging step to produce completed data for the associated document; said developing step being initiated after said diverting step and being performed while the associated document is in said reject area; and (8) storing said completed data in said memory so as to provide a list of those said documents having an incomplete signal initially associated therewith.

6. The method as claimed in claim 5 in which said developing step includes displaying an image produced by said digitized image data to enable an operator to view said image to produce said completed data.

7. A method of providing on-line and concurrent re-entry of rejected documents comprising the steps of:

(1) moving the documents along a track in a sorter in reading relationship with a reader;
(2) reading data from said documents during said moving step;
(3) deciding whether the data read in said reading step is complete or incomplete with regard to predetermined criteria;
(4) storing the data read from said documents in a memory and in a manner enabling the data read from said documents to be distinguished as complete or incomplete with regard to the associated documents;
(5) imaging said documents after said reading step while being moved along said track so as to produce digitized image data for each said document;
(6) diverting into a reject area those documents whose data read is incomplete;
(7) developing data for each of said documents whose data read from said reading step is incomplete by utilizing the associated data from said reading step and the associated digitized image data from said imaging step to produce completed data for the associated document; said developing step being initiated after said diverting step and being performed while the associated document is in said reject area;
(8) storing said completed data in said memory so as to provide a list of those said documents having an incomplete signal initially associated therewith; and
(9) removing said documents from said reject area and thereafter moving said last-named documents in said track in a second pass through said sorter to enable said last-named documents to be sorted according to the associated said completed data in said memory.

* * * * *